(12) United States Patent
Dai et al.

(10) Patent No.: US 11,713,553 B2
(45) Date of Patent: Aug. 1, 2023

(54) BASALT FIBER ANCHORING SYSTEM WITH ACCURATE SECTIONED GROUTING AND MOUNTING METHOD THEREOF

(71) Applicant: Wuhan Center, China Geological Survey (Central South China Innovation Center for Geosciences), Wuhan (CN)

(72) Inventors: Zhenwei Dai, Wuhan (CN); Shengtao Zhou, Wuhan (CN); Xiaolin Fu, Wuhan (CN); Yanjun Zhang, Wuhan (CN); Anle Zhang, Wuhan (CN); Jinjun Guo, Wuhan (CN)

(73) Assignee: Wuhan Center, China Geological Survey (Central South China Innovation Center for Geosciences), Wuhan (CN)

( * ) Notice: Subject to any disclaimer, the term of this patent is extended or adjusted under 35 U.S.C. 154(b) by 35 days.

(21) Appl. No.: 17/560,326

(22) Filed: Dec. 23, 2021

(65) Prior Publication Data
US 2023/0094882 A1    Mar. 30, 2023

(30) Foreign Application Priority Data
Sep. 24, 2021   (CN) .......................... 202111123200.2

(51) Int. Cl.
*E02D 5/80* (2006.01)
*E02D 5/44* (2006.01)
*E02D 5/46* (2006.01)

(52) U.S. Cl.
CPC ............... *E02D 5/808* (2013.01); *E02D 5/44* (2013.01); *E02D 5/46* (2013.01)

(58) Field of Classification Search
CPC combination set(s) only.
See application file for complete search history.

(56) References Cited

U.S. PATENT DOCUMENTS

| 7,174,961 | B2 | 2/2007 | Chatterji et al. |
| 9,725,906 | B2 | 8/2017 | Brock |
| 9,846,105 | B2 | 12/2017 | Wu et al. |

FOREIGN PATENT DOCUMENTS

| CN | 204456128 U | * | 7/2015 |
| KR | 20090010545 A | * | 1/2009 |
| KR | 101851959 B1 | * | 4/2018 |
| KR | 101914901 B1 | * | 11/2018 |
| KR | 20190035381 A | * | 4/2019 |
| KR | 20200088156 A | * | 7/2020 |

* cited by examiner

*Primary Examiner* — Kyle Armstrong
(74) *Attorney, Agent, or Firm* — True Shepherd LLC; Andrew C. Cheng

(57) ABSTRACT

A basalt fiber anchoring system with accurate sectioned grouting includes: a plurality of first base plates arranged in an anchoring borehole, where every two first base plates are arranged at an upper end and a lower end of a section to be grouted respectively; a plurality of basalt fiber reinforced plastics (BFRP) penetrating the plurality of first base plates; and a grouting device including a valve pipe and a grouting core pipe, where the valve pipe penetrates all the first base plates, a plurality of grouting ports are defined in a pipe wall of the valve pipe, each of the plurality of grouting ports is covered with an elastic sheath, the grouting core pipe is sleeved with two grout stop sealing plugs at intervals, a plurality of grout outlets are provided between the two grout stop sealing plugs.

7 Claims, 8 Drawing Sheets

BASALT FIBER ANCHORING SYSTEM WITH ACCURATE SECTIONED GROUTING AND MOUNTING METHOD THEREOF

CROSS-REFERENCE TO RELATED APPLICATIONS

This application claims priority to Chinese Patent Application No. 202111123200.2 with a filing date of Sep. 24, 2021. The content of the aforementioned application, including any intervening amendments thereto, is incorporated herein by reference.

TECHNICAL FIELD

The present disclosure relates to the technical field of prevention and control over geological disasters, and particularly relates to a basalt fiber anchoring system with accurate sectioned grouting and a mounting method thereof.

BACKGROUND OF THE PRESENT INVENTION

The steel prestressed anchor cables are commonly used for reinforcing the hydro-fluctuation belt of the bank slope in a reservoir area valley. However, the steel prestressed anchor cables are prone to corrosion due to impact of the seasonal water level change on the hydro-fluctuation belt of the bank slope, which brings certain potential safety hazards to the reservoir bank slope permanent anchoring project. Currently, a large number of novel fiber-reinforced composite anchor rods (cables) are emerging and provide a new idea for reinforcement of the hydro-fluctuation belt of the bank slope of the reservoir. The basalt fiber reinforced plastic has a tensile strength larger than 1.1 GPa and density merely ⅓-¼ that of steel bars, and has good corrosion resistance, high stability, low raw material cost, and the like. Therefore, it has become an environment-friendly light material for manufacturing the anchor cable and is expected to serve as an alternative of the steel anchor cable in the field of rock mass anchorage of the bank slope of the reservoir. In addition, the rock mass of the hydro-fluctuation belt is likely to generate the grike and the water-eroded groove under the action of long-term change of the reservoir water level, and joint fissure develop massively. In such case, grout leakage is likely to occur in a traditional anchor cable grouting process, and construction cannot be conducted smoothly.

SUMMARY OF PRESENT INVENTION

In view of this, to solve the problem of grouting in basalt fiber reinforced plastic (BFRP) anchor cable reinforcement engineering of a rock mass of a hydro-fluctuation belt of a bank slope in a reservoir area valley, the embodiment of the present disclosure provides a basalt fiber anchoring system with accurate sectioned grouting and a mounting method thereof.

An embodiment of the present disclosure provides a basalt fiber anchoring system with accurate sectioned grouting, including:

a plurality of first base plates arranged in an anchoring borehole, where the number of the first base plates is twice that of sections to be grouted, an upper end and a lower end of each of the sections to be grouted are each provided with one first base plate, two first base plates form a set, and the first base plates of each set are arranged at the upper end and the lower end of the section to be grouted respectively;

a plurality of BFRPs arranged in the anchoring borehole, where each of the plurality of BFRPs penetrates all the first base plates; and a grouting device including a valve pipe and a grouting core pipe arranged in the valve pipe, where the valve pipe penetrates all the first base plates, a plurality of grouting ports are defined in a pipe wall of the valve pipe, each of the plurality of grouting ports is covered with an elastic sheath, the grouting core pipe is sleeved with two grout stop sealing plugs at intervals, the two grout stop sealing plugs make contact with an inner wall of the valve pipe, a plurality of grout outlets are defined in a portion, between the two grout stop sealing plugs, of a pipe wall of the grouting core pipe, after the two grout stop sealing plugs move to the section to be grouted, grout is sprayed out from the grout outlet, pressure between the grouting core pipe and the valve pipe is increased, an upper end and a lower end of the elastic sheath are pressed and curled towards a middle, and then the grout is injected into a gap between the valve pipe and the anchoring borehole via the grouting port.

Further, the valve pipe is provided with a plurality of radial sections in which the grouting ports are provided, at intervals in a length direction, a plurality of grouting ports are evenly defined in each of the radial sections, each of the radial sections is sleeved with one elastic sheath, and the elastic sheath covers all the grouting ports on the same radial section.

Further, each of the plurality of grouting ports includes two grouting sub-ports which are spaced one above the other, grouting pressure acts on the elastic sheath via the two grouting sub-ports, the two ends of the elastic sheath curl towards the middle under the action of the grouting pressure, and then the grout is smoothly injected into a gap between the anchoring borehole and the valve pipe, so as to achieve grouting.

Further, the two first base plates at the two ends of each section to be grouted are connected via a plurality of fixing rods, two ends of each of the fixing rods respectively penetrate the two first base plates and are connected to fasteners located on outer sides of the first base plates, and expanding sections abutting against inner sides of the first base plates are correspondingly arranged on the fixing rods.

Further, the basalt fiber anchoring system with accurate sectioned grouting includes a prefabricated concrete hole plug arranged at an opening of the anchoring borehole, and a second base plate arranged in the anchoring borehole and close to the prefabricated concrete hole plug, where the BFRP and the valve pipe penetrate the prefabricated concrete hole plug and the second base plate, and an outer grouting pipe penetrating an upper end and a lower end of the prefabricated concrete hole plug is arranged on the prefabricated concrete hole plug.

Further, the basalt fiber anchoring system with accurate sectioned grouting further includes a tensioning device, where the tensioning device includes a reaction frame fixed outside the opening of the anchoring borehole, and an anchor ring, a limiting plate, a center hole jack and a plurality of homologous-material variable-rigidity gripping sheets sequentially arranged on the reaction frame from bottom to top, and the BFRP sequentially penetrates the reaction frame, the anchor ring, the limiting plate and the center hole jack and is tightly held by the homologous-material variable-rigidity gripping sheets.

Further, a plurality of anchor holes are defined in the anchor ring, a set of homologous-material variable-rigidity clips is arranged in each of the anchor holes, and the BFRP penetrates the anchor hole and is enclosed and clamped by one set of homologous-material variable-rigidity clips.

Further, the homologous-material variable-rigidity clip is a conical block, has an outer diameter gradually increased from bottom to top, and comprises a chinlon section, a basalt fiber section and a carbon fiber section.

Further, the homologous-material variable-rigidity gripping sheet includes two semicircular hoop holding sheets detachably connected, and each hoop holding sheet includes a chinlon layer, a basalt fiber layer and a carbon fiber layer from inside to outside.

In addition, the embodiment of the present disclosure further provides a mounting method for a basalt fiber anchoring system with accurate sectioned grouting. The mounting method uses the above basalt fiber anchoring system with accurate sectioned grouting and includes:

S1, using an underground television to acquire a full-borehole image of an inner wall of an anchoring borehole, analyzing a development situation of a fissure of a rock mass in the anchoring borehole, then determining the number, a length and a specific position of a section to be grouted, and further determining a mounting position of a second base plate;

S2, mounting first base plates at positions, corresponding to an upper end and a lower end of each section to be grouted, of a valve pipe respectively, using a fixing rod to connect the two first base plates corresponding to the upper end and the lower end of the section to be grouted, mounting the second base plate, making a BFRP penetrate all the first base plates and the second base plate, and lowering the BFRP and the valve pipe into the anchoring borehole;

S3, inserting a grouting core pipe into a bottom of the valve pipe, moving the grouting core pipe upwards, controlling, when two grout stop sealing plugs move to each section to be grouted, the grouting core pipe to spray out grout from a grout outlet, so as to increase pressure between the grouting core pipe and the valve pipe, and further to press and curl an upper end and a lower end of an elastic sheath towards a middle, such that grout is injected into a space between the valve pipe and the anchoring borehole via the grouting port, and stopping grouting until gaps among the anchoring borehole of a grouting section, the two first base plates and the valve pipe are filled with the grout injected;

S4, sleeving, when strength of a high-strength cement mortar anchoring section in the anchoring borehole reaches tensionable strength, a prefabricated high-strength concrete hole plug on the BFRP, mounting a reaction frame outside the anchoring borehole, making all the BFRPs penetrate the reaction frame, sequentially mounting an anchor ring, a limiting plate and a center hole jack at an upper end of the reaction frame, making all the BFRPs sequentially penetrate the anchor ring, the limiting plate and the center hole jack, mounting a homologous-material variable-rigidity clip in each anchor hole of the anchor ring to clamp the BFRP, and mounting a homologous-material variable-rigidity gripping sheet at an upper end of the BFRP to clamp the BFRP;

S5, starting the center hole jack 18, integrally tensioning the BFRP 2, injecting early-strength micro-expansion cement mortar into a gap between the prefabricated high-strength concrete hole plug and the second base plate via an outer grouting pipe when the BFRP is tensioned to a designed anchoring force, and stopping grouting until gaps among the BFRP, the valve pipe, the prefabricated high-strength concrete hole plug and the second base plate are filled with the early-strength micro-expansion cement mortar; and S6, locking, when the early-strength micro-expansion cement mortar reaches target strength, the BFRP at an anchor head by the prefabricated high-strength concrete hole plug, closing the center hole jack, cutting off the BFRP along an upper surface of the prefabricated high-strength concrete hole plug, and detaching a tensioning device, so as to complete construction of a tension type basalt fiber anchor cable.

The technical solution defined in the embodiment of the present disclosure has the beneficial effects that a plurality of sections to be grouted are designed in a non-development section of a joint fissure of a rock mass according to a development condition of the joint fissure of the rock mass on a wall of the anchoring borehole, and accurate sectioned grouting is achieved for the anchoring borehole, such that the problem that grout is prone to seepage and loss along the joint fissure during anchor cable grouting of a fissured rock mass stratum is effectively solved; when each section to be grouted is grouted, an elastic sheath is opened under the action of grouting pressure, after grouting is finished, the elastic sheath restores to an original shape to cover a grouting port anew, it is guaranteed that recharging of the grout in the grouted section does not occur, and the grout recharge problem in an accurate grouting process is effectively solved; and prestress (drawing force) is directly applied to the basalt fiber anchor cable by using a homologous-material variable-rigidity clip and a homologous-material variable-rigidity gripping sheet, large stress concentration at a loading end of the clip may be effectively avoided, and the BFRP is prevented from being pinched off in a tensioning process.

In the figures: 1—first base plate, 101—rubber seal ring, 102—grouting through hole, 103—bar through hole, 102a/103a—rubber sealing ring, 104—fixing through hole, 2—basalt fiber reinforced plastic, 3—valve pipe, 4—grouting core pipe, 5—elastic sheath, 6—section to be grouted, 7—prefabricated concrete hole plug, 8—outer grouting pipe, 9—second base plate, 10—joint fissure, 11—grout stop sealing plug, 12—grout outlet, 13—grouting port, 13a—grouting sub-port, 14—fixing rod, 14a—expanding section, 14b—fastener, 14c—rubber gasket, 15—reaction frame, 16—anchor ring, 17—limiting plate, 18—center hole jack, 19—homologous-material variable-rigidity gripping sheet, 19a—chinlon layer, 19b—basalt fiber layer, 19c—carbon fiber layer, 19d—extension sheet, 20—homologous-material variable-rigidity clip, 20a—chinlon section, 20b— basalt fiber section, 20c—carbon fiber section, 21—clamping nut, and 22—clamping screw rod.

DETAILED DESCRIPTION OF PREFERRED EMBODIMENTS

In order to make the objective, technical solution and advantages of the present disclosure clearer, embodiments of the present disclosure will be further described in detail in conjunction with the accompanying drawings.

Figure 1:
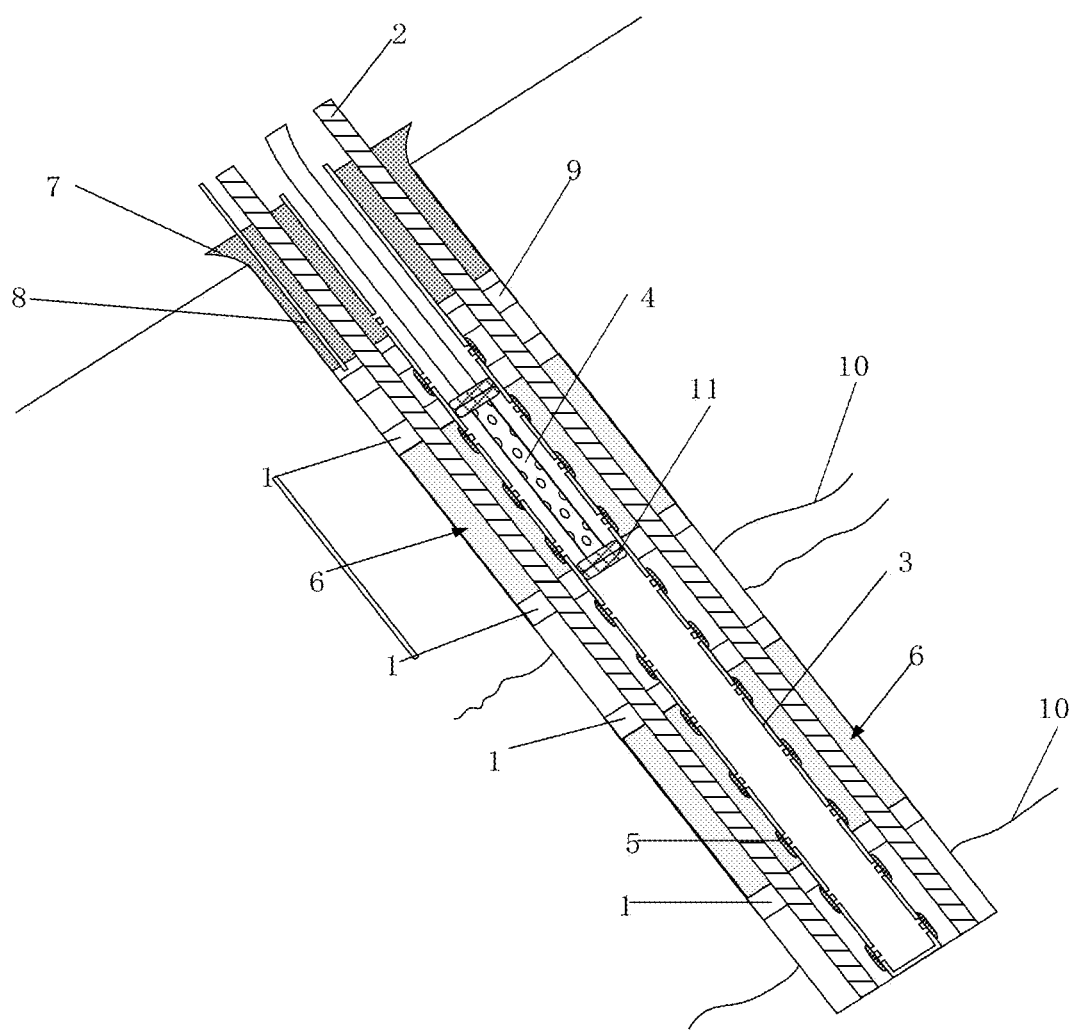
FIG. 1 is a schematic diagram of a basalt fiber anchoring system with accurate sectioned grouting in the present disclosure.
Figure 2:
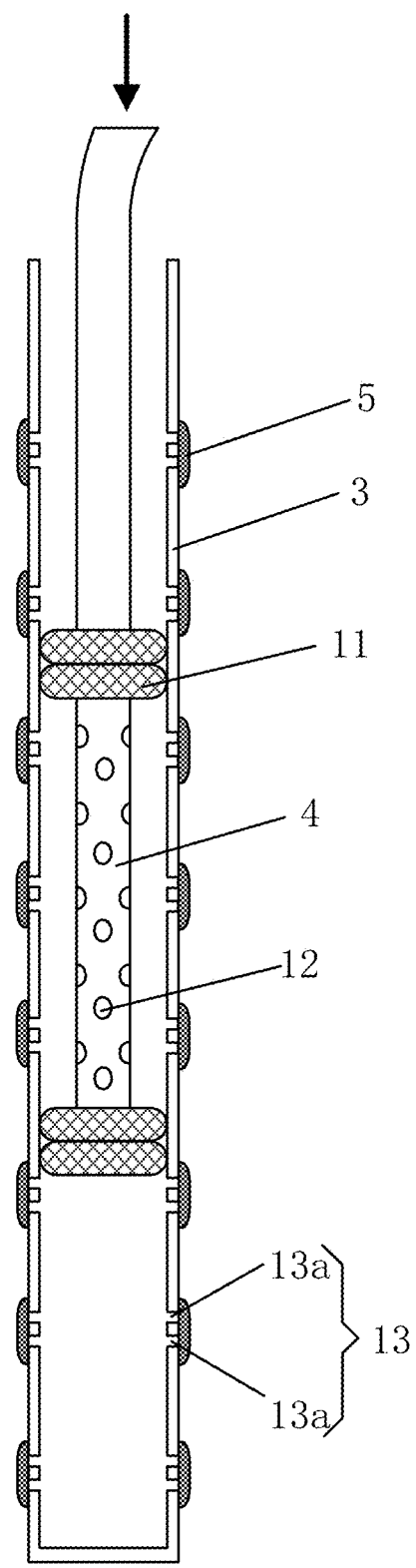
FIG. 2 is a schematic diagram of a grouting device in FIG. 1.
Figure 5:
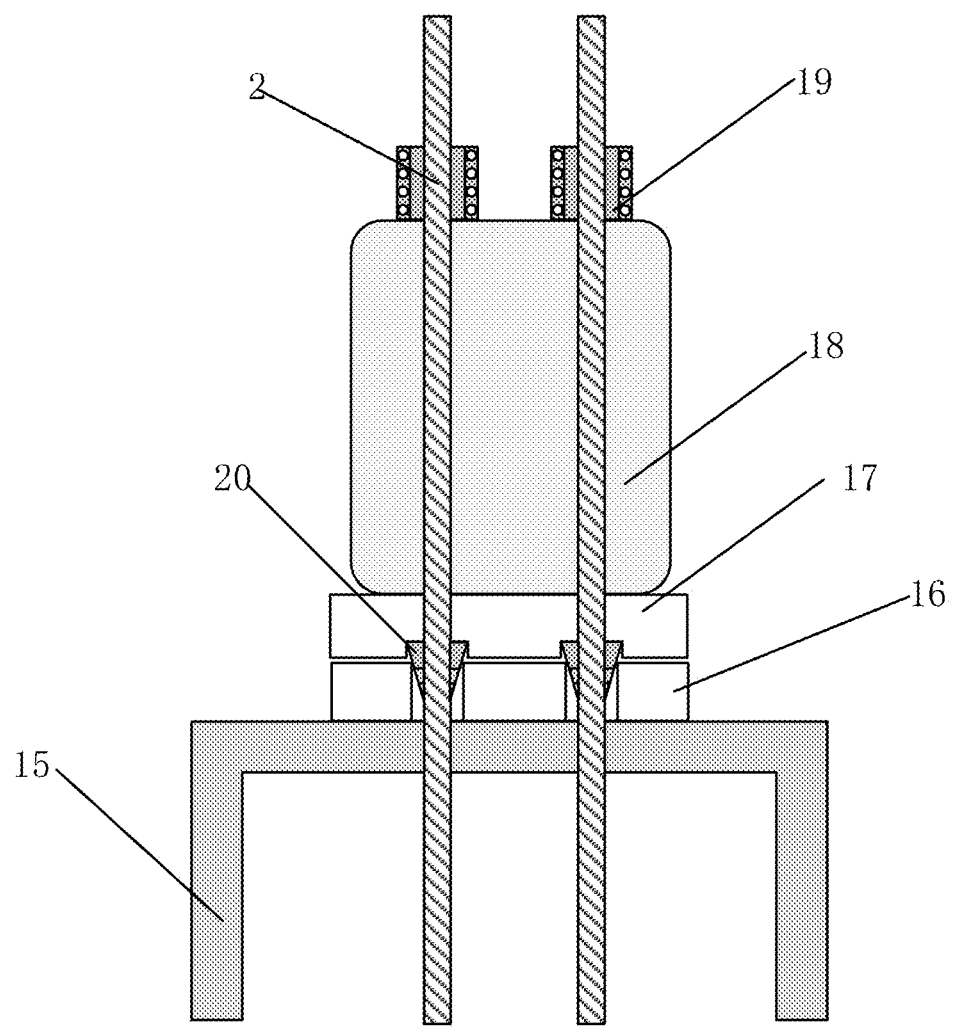
FIG. 5 is a schematic diagram of a tensioning device.

With reference to FIGS. 1, 2 and 5, the embodiment of the present disclosure provides a basalt fiber anchoring system with accurate sectioned grouting. The anchoring system mainly includes a plurality of first base plates 1, a plurality of basalt fiber ribs (BFRP) 2, a grouting device and a tensioning device, and the number of the first base plates 1 is twice that of a section 6 to be grouted.

One first base plate 1 is arranged at each of an upper end and a lower end of each section 6 to be grouted. The first base plate 1 is of a disc shape, and an outer wall thereof makes contact with an anchoring borehole in an attached mode. Preferably, the outer wall of the first base plate 1 is sleeved with a rubber seal ring 101, the rubber seal ring 101 may make the outer wall of the first base plate 1 tightly attached to an inner wall of the anchoring borehole, and it may be guaranteed that grout injected is well blocked.

Figure 3:
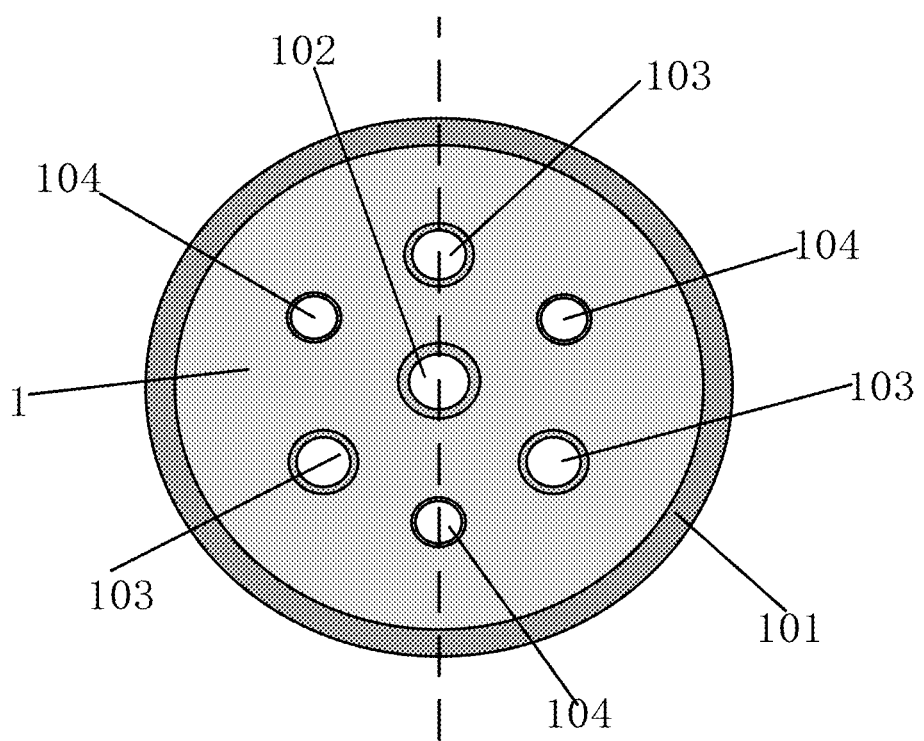
FIG. 3 is a schematic diagram of a first base plate 1 in FIG. 1.
Figure 4:
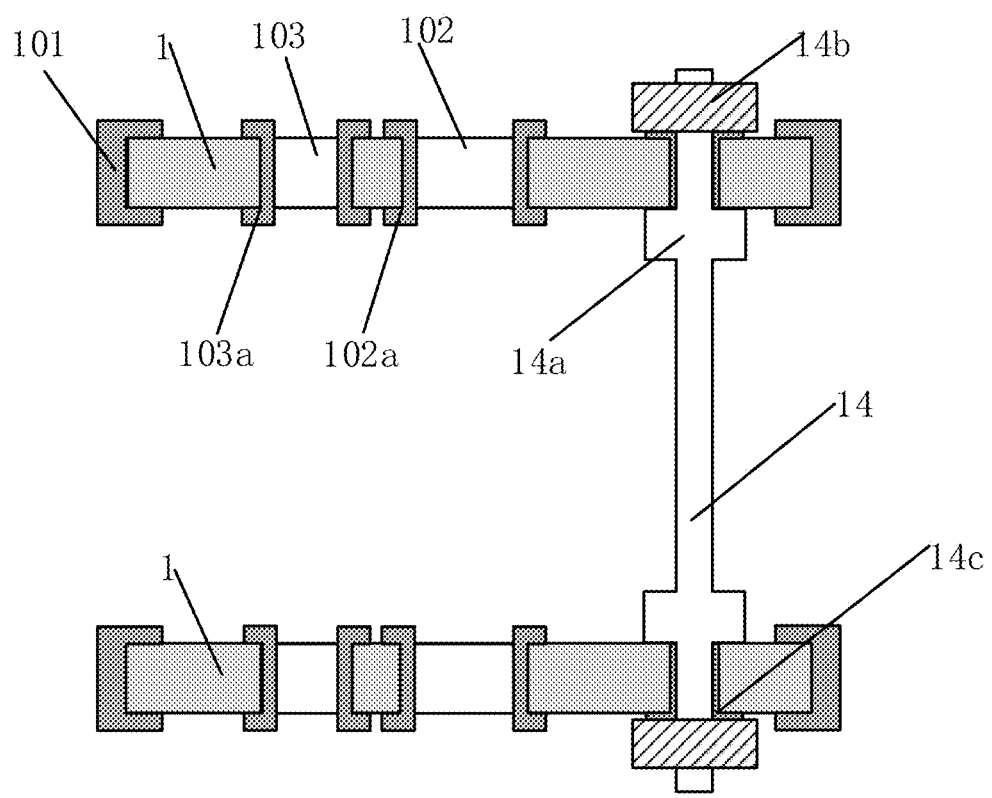
FIG. 4 is a schematic diagram of connection of two first base plates 1.

With reference to FIGS. 3 and 4, for facilitating mounting arrangement of the two first base plates 1, the two first base plates 1 may be arranged in group. Two ends of each fixing rod 14 penetrate the two first base plates 1 and are connected to fasteners 14b located on outer sides of the first base plates 1, expanding sections 14a abutting against inner sides of the first base plates 1 are arranged at positions, close to the ends, of the two ends of each fixing rod 14, and the expanding sections 14a match the fasteners 14b to clamp the first base plates 1. The fastener 14b may have a variety of options, is herein specifically a fixing nut, which is in threaded connection to the end of the fixing rod 14. Preferably, the first base plate 1 is provided with a fixing through hole 104, the fixing rod 14 penetrates the fixing through hole 104, and a rubber gasket 14c is arranged in the fixing through hole 104 for seal.

The number of the section 6 to be grouted is determined by a depth of the anchoring borehole and a geological feature, and generally, there are a plurality of sections 6 to be grouted. When the plurality of sections 6 to be grouted are provided, the two first base plates 1 at two ends of each of the sections 6 to be grouted are connected via the plurality of fixing rods 14 and arranged in pairs.

The plurality of BFRPs 2 to be anchored are arranged in the anchoring borehole, specifically, a plurality of bar through holes 103 for the BFRPs 2 to penetrate are defined in the first base plate 1, each of the plurality of BFRPs 2 penetrates all the first base plates 1 of each of the sections 6 to be grouted, and a rubber sealing ring 103a for enhancing a sealing effect is arranged in the bar through hole 103. The BFRPs 2 are uniformly distributed around an axis of the first base plate 1 as much as possible, so as to guarantee uniform stress after grouting.

The grouting device is configured to grout each of the sections 6 to be grouted. The grouting device includes a valve pipe 3 and a grouting core pipe 4 arranged in the valve pipe 3. A grouting through hole 102 for the valve pipe 3 to penetrate is further formed in a middle of the first base plates 1, the valve pipe 3 penetrates the first base plate 1, that is, penetrates the section 6 to be grouted, and a rubber sealing ring 102a for enhancing the sealing effect is arranged in the grouting through hole 102. The valve pipe 3 is a pipe body with a lower end closed, a plurality of grouting ports 13 are defined in a pipe wall of the valve pipe 3, an elastic sheath 5 sleeves outsides of the grouting ports 13 in a same radial section, an inner diameter of the elastic sheath 5 is slightly less than a diameter of an outer wall of the valve pipe 3, and the elastic sheath 5 generates certain elastic deformation during mounting, such that the elastic sheath 5 may tightly sleeve the outer wall of the valve pipe 3.

The grouting ports 13 are arranged at intervals in a length direction of the valve pipe 3 and may be arranged in various modes. Preferably, the valve pipe 3 is provided with a plurality of radial sections in which the grouting ports 13 are defined, at intervals in the length direction, a plurality of grouting ports 13 are evenly defined in each of the radial sections, each of the radial sections is sleeved with one elastic sheath 5, and the elastic sheath 5 covers all the grouting ports 13 on the same radial section.

In addition, the elastic sheath 5 and the grouting port 13 are connected and match in a plurality of modes. Each of the plurality of grouting ports 13 includes two grouting subports 13a which are spaced one above the other, the two grouting sub-ports 13a are covered by one elastic sheath 5, grouting pressure is applied to the elastic sheath 5 via the two grouting sub-ports 13a, and after the elastic sheath 5 is pressed, an upper end and a lower end thereof curl towards middle, grout is injected into a gap between the anchoring borehole and the valve pipe 3 via the two grouting sub-ports 13a. The elastic sheath 5 may be a rubber sheath.

The grouting core pipe 4 may be inserted into the valve pipe 3, two grout stop sealing plugs 11 sleeve the grouting core pipe 4 in at intervals, and the two grout stop sealing plugs 11 may slide up and down along the inner wall of the valve pipe 3. A plurality of grout outlets 12 are defined in positions, located between the two grout stop sealing plugs 11, of a pipe wall of the grouting core pipe 4. An outer wall of the grout stop sealing plug 11 makes sealed contact with the inner wall of the valve pipe 3, and two or more grout stop sealing plugs 11 above or below may be provided so as to guarantee the sealing effect. The grout outlets 12 should be uniformly distributed as much as possible, such that the grout in the grouting core pipe 4 may be uniformly sprayed out.

When the grouting core pipe 4 pass through each of sections 6 to be grouted, the two grout stop sealing plugs 11 move to the section 6 to be grouted, and then the grout pumped by the grouting core pipe 4 is sprayed out from the grout outlet 12, so as to increase pressure between the grouting core pipe 4 and the valve pipe 3, and further to press and curl the upper end and the lower end of the elastic sheath 5 towards the middle, such that the grout is injected into a space between the valve pipe 3 and the anchoring borehole via the grouting port 13.

In addition, a second base plate 9 is arranged close to an opening of the anchoring borehole, the BFRP 2 and the valve pipe 3 penetrate the second base plate 9, and the second base plate 9 and the opening of the anchoring borehole are provided with a prefabricated concrete hole plug 7. An upper end of the prefabricated concrete hole plug 7 is of an expanding structure, the prefabricated concrete hole plug 7 is placed in the anchoring borehole, the upper end is supported and fixed via the expanding structure, and a lower end is close to but makes no contact with the second base plate 9. An outer grouting pipe 8 and a plurality of through holes are provided on the prefabricated concrete hole plug 7. The second base plate 9 and the first base plate 1 have same structure, and the upper ends of the BFRP 2 and the valve pipe 3 penetrate the second base plate 9 and the through hole in the prefabricated concrete hole plug 7, so as to extend out of the anchoring borehole.

The outer grouting pipe 4 is configured to pour early-strength micro-expansion cement mortar, such that the tensioned BFRP 2, the valve pipe 3, the prefabricated high-strength concrete hole plug 7, the second base plate 9 and the anchoring borehole are poured into a whole, and the second base plate 9 is used for preventing the early-strength micro-expansion cement mortar from infiltrating downwards.

With reference to FIG. 5, the tensioning device is arranged outside the opening of the anchoring borehole and includes a reaction frame 15 fixed outside the opening of the anchoring borehole, and an anchor ring 16, a limiting plate 17, a center hole jack 18 and a plurality of homologous-material variable-rigidity gripping sheets 19 sequentially arranged on the reaction frame 15 from bottom to top, the upper end of the BFRP 2 sequentially penetrates the reaction frame 15, the anchor ring 16, the limiting plate 17, the center hole jack 18 and the homologous-material variable-rigidity gripping sheet 19, and the homologous-material variable-rigidity gripping sheet 19 with a bottom supported on an upper surface of the center hole jack 18 clamps the BFRP 2.

Figure 7:
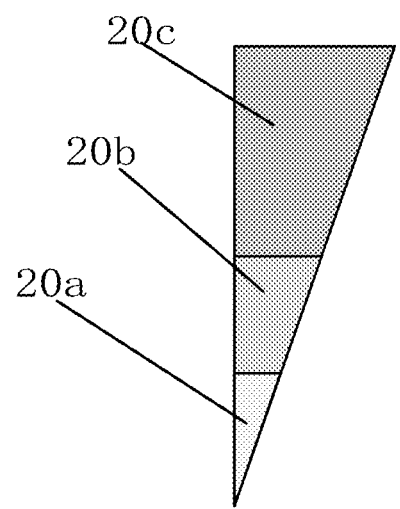
FIG. 7 is a schematic diagram of a homologous-material variable-rigidity clip 20 in FIG. 5.
Figure 8:
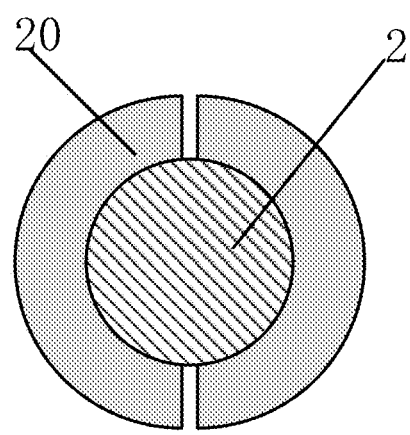
FIG. 8 is a schematic diagram of a set of homologous-material variable-rigidity clips 20 clamping a basalt fiber reinforced plastic 2.

With reference to FIGS. 7 and 8, the anchor ring 16 is provided with a plurality of anchor holes, each of the anchor holes is internally provided with a set of homologous-material variable-rigidity clips 20, the set of homologous-material variable-rigidity clips 20 includes a plurality of conical homologous-material variable-rigidity clips 20, and the homologous-material variable-rigidity clip 20 is a conical block, has an outer diameter gradually increased from bottom to top, and is provided with a chinlon section 20a, a basalt fiber section 20b and a carbon fiber section 20c. The BFRP 2 penetrates the anchor hole and is surrounded and clamped by the homologous-material variable-rigidity clip 20, a smaller end of the homologous-material variable-rigidity clip 20 is inserted into the anchor hole, and a larger end thereof is embedded into a groove in the limiting plate 17.

Figure 6:
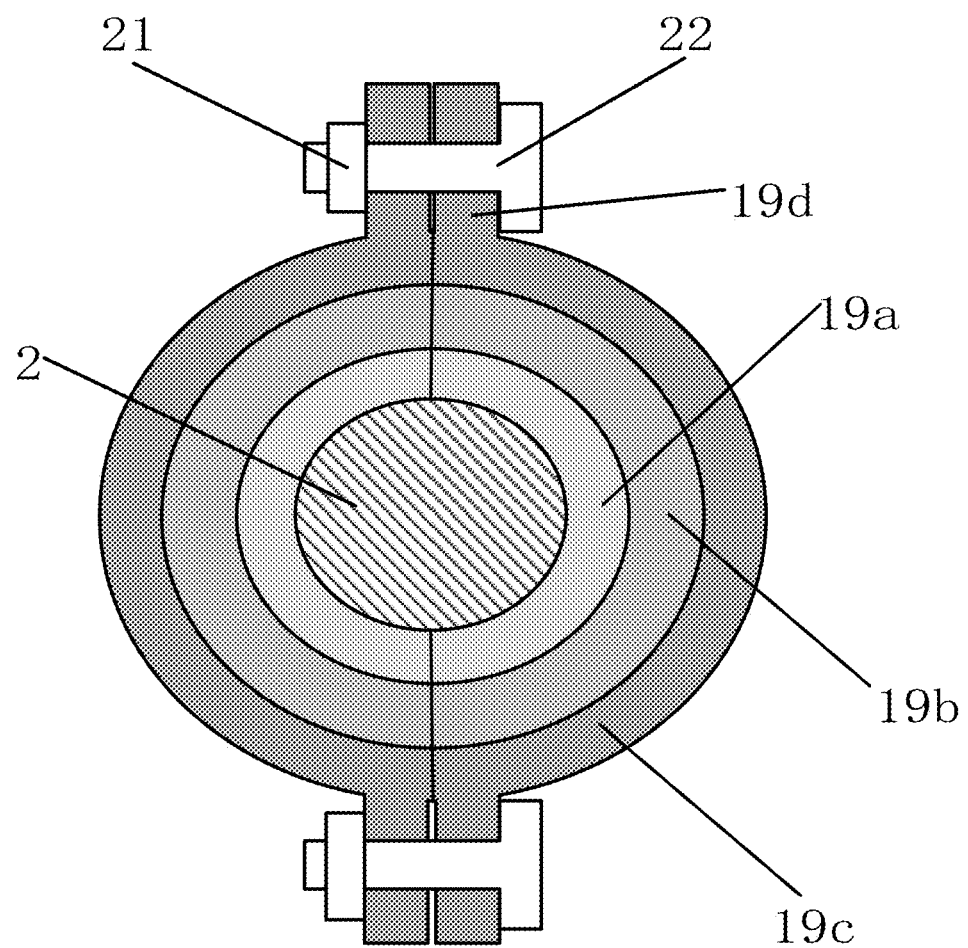
FIG. 6 is a schematic diagram of a homologous-material variable-rigidity gripping sheet 19 in FIG. 5.

With reference to FIG. 6, the homologous-material variable-rigidity gripping sheet 19 may include two semicircular hoop holding sheets detachably connected, and each hoop holding sheet includes a chinlon layer 19a, a basalt fiber layer 19b and a carbon fiber layer 19c from inside to outside. Two ends of the carbon fiber layer 19c extend outwards to form an extension sheet 19d, a plurality of clamping through holes are defined in the extension sheet 19d, and the clamping through holes in two hoop holding sheet gripping the same BFRP 2 are in one-to-one correspondence. Each clamping screw rod 22 penetrates two corresponding clamping through holes in the two hoop holding sheets from one side, and each clamping nut 21 is in threaded connection to the clamping screw rod 22 from the other side, such that the BFRP 2 is clamped by the two hoop holding sheets.

Rigidity of the homologous-material variable-rigidity gripping sheet 19 is gradually increased from inside to outside, such that deformation coordination between the homologous-material variable-rigidity gripping sheet 19 and the BFRP 2 during gripping is guaranteed, and the BFRP 2 is prevented from being damaged in a tensioning process. An inner surface of the chinlon layer 19a is subjected to rough treatment, so as to guarantee that a static friction coefficient between the BFRP 2 and the chinlon layer 19a is large enough, enough static friction force may be generated between the BFRP and the chinlon layer, and slipping between the homologous-material variable-rigidity gripping sheet 19 and the BFRP 2 is avoided.

With reference to FIGS. 1, 2, 3 and 4, in addition, the embodiment of the present disclosure further provides an accurate sectioned grouting method for a tension type basalt fiber anchor cable. The method uses the above accurate sectioned grouting system for a tension type basalt fiber anchor cable and includes:

S1, an underground television is used to acquire a full-borehole image of an inner wall of an anchoring borehole, a development situation of a joint fissure 10 of a rock mass in the anchoring borehole is analyzed, then the number, a length and a specific position of a section 6 to be grouted is determined, and a mounting position of a second base plate 9 is further determined.

Specifically, according to the acquired 360° full-borehole image of the inner wall of the anchoring borehole, a borehole section with a continuous 30-cm borehole wall free of joint fissure 10 developed is divided into a section 6 to be grouted (anchoring section), a total length of the anchoring section is determined, a mark number of an anchoring agent (cement) needed for the total length of the anchoring section is calculated according to a design requirement, and in addition, a mounting position of the second base plate 9 is determined according to a position of the uppermost section 6 to be grouted; under the condition that a maximum value of the mark number of the anchoring agent (cement) still may not meet the anchoring requirement, an original drill bit is used for continuously drilling the anchoring borehole, the underground television is used for acquiring a 360° borehole image of an inner wall of a new drilling section in the anchoring borehole again, then the total length of the anchoring section is determined by combining the newly acquired inner wall borehole image and the original inner wall borehole image, a mark number of the anchoring agent (cement) need by the total length of the corresponding anchoring section is calculated, and in addition, the mounting position of the second base plate 9 is determined according to the position of the uppermost section 6 to be grouted.

S2, first base plates 1 are mounted at positions, corresponding to an upper end and a lower end of each section 6 to be grouted, of a valve pipe 3 respectively, the second base plate 9 is mounted, a BFRP 2 penetrates all the first base plates 1 and the second base plate 9, and the BFRP 2 and the valve pipe 3 are lowered into the anchoring borehole.

Specifically, firstly, the number and a diameter of the BFRP 2 are determined according to a design value of anchoring force of the basalt fiber anchor cable in the anchoring borehole, a length of the BFRP 2 is determined in combination with a depth of the anchoring borehole, the BFRP 2 with the corresponding number and the corresponding length is cut to serve as anchor cable raw materials, the first base plate 1 and the second base plate 9 matching the BFRP 2 in number and diameter are selected, and a fixing rod 14 is designed and manufactured according to a length of the section 6 to be grouted.

According to distribution positions of the section 6 to be grouted, the mounting positions of the two first base plates 1 corresponding to each section 6 to be grouted are determined on the BFRP 2 and marked. In addition, it is also necessary to mark the mounting position of the second base plate 9. A prefabricated high-strength concrete hole plug 7 is poured, and a main body of the outer grouting pipe 8 is poured into the prefabricated high-strength concrete hole plug 7 and penetrates an upper end and a lower end of the prefabricated high-strength concrete hole plug 7. The first base plate 1 is arranged on the valve pipe 3 and at the section 6 to be grouted.

After all the first base plates 1 are mounted, the BFRP 2 penetrates all the first base plates 1, marks on the BFRPs 2 correspond one-to-one to all the first base plates 1, then the second base plate 9 is mounted to the designed position, and a complete basalt fiber anchor cable is formed; and the assembled basalt fiber anchor cable is lowered into the anchoring borehole.

S3, a grouting core pipe 4 is inserted into a bottom of the valve pipe 3, the grouting core pipe 4 is moved upwards, when two grout stop sealing plugs 11 of the grouting core pipe 4 move to a first section 6 to be grouted, the grouting core pipe 4 is controlled to spray out high-strength cement mortar from a grout outlet 12, so as to increase pressure between the grouting core pipe 4 and the valve pipe 3, and further to press and curl an upper end and a lower end of an elastic sheath 5 towards a middle, such that the high-strength cement mortar is sprayed out of the grouting port 13 and injected into a space between the valve pipe 3 and the anchoring borehole, grouting is stopped until gaps among the borehole of a grouting section, the two first base plates and the valve pipe are filled with the high-strength cement mortar, the grouting core pipe is lifted to a next section to be grouted, and the grouting operation is repeated until sectioned grouting is completed.

Specifically, when the two grout stop sealing plugs 11 of the grouting core pipe 4 move to one section 6 to be grouted, it is guaranteed that all grout outlets 12 are located between the two first base plates 1 of the section 6 to be grouted. The high-strength cement mortar is pumped into the grouting core pipe 4 under a certain pressure, a gap between the valve pipe 3 and the grouting core pipe 4 is filled with the high-strength cement mortar grout firstly, and then under the action of pressure, the elastic sheath 5 is squeezed to open, and the high-strength cement mortar is continuously injected into a gap between the anchoring borehole and the valve pipe 3 via the grouting port 13, grouting is stopped until the high-pressure cement mortar may not be pumped, and the grouting core pipe 4 is lifted to the next section 6 to be grouted.

The steps are repeated until grouting of all sections 6 to be grouted in the anchoring borehole is completed, the grouting core pipe 4 is taken out, and the high-strength cement mortar is poured into the valve pipe 3 until the high-strength cement mortar is poured to an opening of the valve pipe 3, such that pipe sealing treatment of the valve pipe 3 is completed.

S4, when strength of high-strength cement mortar at the anchoring section in the anchoring borehole reaches tensionable strength, a prefabricated high-strength concrete hole plug 7 is sleeved on the BFRP, a reaction frame 15 is mounted outside the anchoring borehole, all the BFRPs 2 of the basalt fiber anchor cable penetrate the reaction frame 15, an anchor ring 16, a limiting plate 17 and a center hole jack 18 are sequentially mounted at an upper end of the reaction frame 15, the BFRP 2 sequentially penetrates the anchor ring 16, the limiting plate 17 and the center hole jack 18, and a homologous-material variable-rigidity clip 20 is mounted in each anchor hole of the anchor ring 16 to clamp the BFRP 2; and according to the design value of the anchoring force of the basalt fiber anchor cable, homologous-material variable-rigidity gripping sheets 19 with different gripping lengths are selected, the homologous-material variable-rigidity gripping sheet 19 is mounted on the BFRP 2, the gripped BFRP 2 is clamped by the homologous-material variable-rigidity gripping sheet 19, and a bottom of the homologous-material variable-rigidity gripping sheet 19 abuts against an upper end of the center hole jack 18.

S5, the center hole jack 18 is started, the BFRP 2 is integrally tensioned, early-strength micro-expansion cement mortar is injected into a gap between the prefabricated high-strength concrete hole plug 7 and the second base plate 9 via an outer grouting pipe 8 when the BFRP 2 is tensioned to a designed anchoring force, and grouting is stopped until it is observed that a gap among the BFRP 2, the valve pipe 3, and the prefabricated high-strength concrete hole plug 7 is filled with the cement mortar; and S6, when the early-strength micro-expansion cement mortar reaches target strength, the BFRP 2 at an anchor head is locked by the prefabricated high-strength concrete hole plug 7, the center hole jack 18 is closed, the BFRP 2 is cut off along an upper surface of the prefabricated high-strength concrete hole plug 7, and a tensioning device is detached, so as to complete construction of a tension type basalt fiber anchor cable.

In the specification, the terms such as front, back, top and down are defined based on the positions of parts in the drawings. They are merely intended for the clarity and convenience of expressing the technical solutions. It should be understood that these terms do not limit the protection scope of the present application.

The above embodiments and the features of the embodiments herein may be combined with each other without conflict.

The above descriptions are merely preferred examples of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. A basalt fiber anchoring system with accurate sectioned grouting, comprising:
    a plurality of first base plates arranged in an anchoring borehole, wherein a number of the first base plates is twice that of sections to be grouted, an upper end and a lower end of each of the sections to be grouted are each provided with one first base plate, two first base plates form a set, and the first base plates of each set are arranged at the upper end and the lower end of the section to be grouted respectively;
    a plurality of basalt fiber reinforced plastics (BFRP) arranged in the anchoring borehole, wherein each of the plurality of BFRPs penetrates all the first base plates;
    a grouting device comprising a valve pipe and a grouting core pipe arranged in the valve pipe, wherein the valve pipe penetrates all the first base plates, a plurality of grouting ports are defined in a pipe wall of the valve pipe, each of the plurality of grouting ports is covered with an elastic sheath, the grouting core pipe is sleeved with two grout stop sealing plugs at intervals, the two grout stop sealing plugs make contact with an inner wall of the valve pipe, a plurality of grout outlets are defined in a portion, between the two grout stop sealing plugs, of a pipe wall of the grouting core pipe, after the two grout stop sealing plugs move to each section to be grouted, grout is sprayed out from the grout outlet, pressure between the grouting core pipe and the valve pipe is increased, an upper end and a lower end of the elastic sheath are pressed and curled towards a center of the elastic sheath, and then the grout is injected into a position between the valve pipe and the anchoring borehole via the grouting port;

a prefabricated concrete hole plug arranged at an opening of the anchoring borehole;

a second base plate arranged in the anchoring borehole and close to the prefabricated concrete hole plug, wherein the BFRP and the valve pipe penetrate the prefabricated concrete hole plug and the second base plate, and an outer grouting pipe penetrating an upper end and a lower end of the prefabricated concrete hole plug is arranged on the prefabricated concrete hole plug; and a tensioning device, wherein the tensioning device comprises a reaction frame fixed outside the opening of the anchoring borehole, and an anchor ring, a limiting plate, a center hole jack and a plurality of gripping structures sequentially arranged on the reaction frame from bottom to top; the BFRP sequentially penetrates the reaction frame, the anchor ring, the limiting plate and the center hole jack and is tightly held by the gripping elements; and each of the plurality of gripping structures comprises two semicircular hoop holding elements detachably connected, and each hoop holding element comprises a chinlon layer, a basalt fiber layer and a carbon fiber layer from inside to outside.

2. The basalt fiber anchoring system according to claim 1, wherein the valve pipe is provided with a plurality of radial sections in which the grouting ports are defined, at intervals in a length direction; a plurality of grouting ports are evenly defined in each of the radial sections; each of the radial sections is sleeved with one elastic sheath; and the elastic sheath covers all the grouting ports on the same radial section.

3. The basalt fiber anchoring system according to claim 2, wherein each of the plurality of grouting ports comprises two grouting sub-ports which are spaced one above the other, grouting pressure acts on the elastic sheath via the two grouting sub-ports, the two ends of the elastic sheath curl towards the center of the elastic sheath under the action of the grouting pressure, and then the grout is smoothly injected into a gap between the borehole and the valve pipe, so as to achieve grouting.

4. The basalt fiber anchoring system according to claim 3, wherein the two first base plates at the two ends of each section to be grouted are connected via a plurality of fixing rods, two ends of each of the fixing rods respectively penetrate the two first base plates and are connected to fasteners located on outer sides of the first base plates, and expanding sections abutting against inner sides of the first base plates are correspondingly arranged on the fixing rods.

5. The basalt fiber anchoring system according to claim 1, wherein a plurality of anchor holes are defined in the anchor ring, a set of splints are arranged in each of the anchor holes, and the BFRP penetrates the anchor hole and is enclosed and clamped by one set of splints are arranged in each of the anchor holes, and the BFRP penetrates the anchor hole and is enclosed and clamped by one set of splints.

6. The basalt fiber anchoring system according to claim 5, wherein the splints is a conical block, has an outer diameter gradually increased from bottom to top, and comprises a chinlon section, a basalt fiber section and a carbon fiber section.

7. A method for mounting the basalt fiber anchoring system according to claim 1, comprising:

S1, using an underground television to acquire a full-borehole image of an inner wall of an anchoring borehole, analyzing a development situation of a fissure of a rock mass in the anchoring borehole, then determining a number, a length and a specific position of a section to be grouted, and further determining a mounting position of a second base plate;

S2, mounting first base plates at positions, corresponding to an upper end and a lower end of each section to be grouted, of a valve pipe respectively, using a fixing rod to connect the two first base plates corresponding to the upper end and the lower end of the section to be grouted, mounting the second base plate, making a BFRP penetrate all the first base plates and the second base plate, and lowering the BFRP and the valve pipe into the anchoring borehole;

S3, inserting a grouting core pipe into a bottom of the valve pipe, moving the grouting core pipe upwards, controlling, when two grout stop sealing plugs move to each section to be grouted, the grouting core pipe to spray out grout from a grout outlet, so as to increase pressure between the grouting core pipe and the valve pipe, and further to press and curl an upper end and a lower end of an elastic sheath towards a center of the elastic sheath, such that the grout is injected into a space between the valve pipe and the anchoring borehole via the grouting port, and stopping grouting until gaps among the anchoring borehole of a grouting section, the two first base plates and the valve pipe are filled with the grout injected;

S4, sleeving, when strength of a high-strength cement mortar anchoring section in the anchoring borehole reaches tensionable strength, a prefabricated high-strength concrete hole plug on the BFRP, mounting a reaction frame outside the anchoring borehole, making all the BFRPs penetrate the reaction frame, sequentially mounting an anchor ring, a limiting plate and a center hole jack at an upper end of the reaction frame, making all the BFRPs sequentially penetrate the anchor ring, the limiting plate and the center hole jack, mounting a splint in each anchor hole of the anchor ring to clamp the BFRP, and mounting a gripping structure at an upper end of the BFRP to clamp the BFRP;

S5, starting the center hole jack, integrally tensioning the BFRP, injecting early-strength micro-expansion cement mortar into a gap between the prefabricated high-strength concrete hole plug and the second base plate via an outer grouting pipe when the BFRP is tensioned to a designed anchoring force, and stopping grouting until gaps among the BFRP, the valve pipe, the prefabricated high-strength concrete hole plug and the second base plate are filled with the grout injected; and S6, locking, when the early-strength micro-expansion cement mortar reaches target strength, the BFRP at an anchor head by the prefabricated high-strength concrete hole plug, closing the center hole jack, cutting off the BFRP along an upper surface of the prefabricated high-strength concrete hole plug, and detaching a tensioning device, so as to complete construction of a tension type basalt fiber anchor cable.

* * * * *